US010269297B2

(12) United States Patent
Chen et al.

(10) Patent No.: US 10,269,297 B2
(45) Date of Patent: Apr. 23, 2019

(54) PIXEL CIRCUIT AND DRIVING METHOD THEREOF, AND DISPLAY PANEL

(71) Applicant: BOE TECHNOLOGY GROUP CO., LTD., Beijing (CN)

(72) Inventors: Xiaochuan Chen, Beijing (CN); Shengji Yang, Beijing (CN); Can Zhang, Beijing (CN); Lei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/748,956

(22) PCT Filed: Jun. 28, 2017

(86) PCT No.: PCT/CN2017/090618
§ 371 (c)(1),
(2) Date: Jan. 30, 2018

(87) PCT Pub. No.: WO2018/095031
PCT Pub. Date: May 31, 2018

(65) Prior Publication Data

US 2019/0035333 A1 Jan. 31, 2019

(30) Foreign Application Priority Data

Nov. 24, 2016 (CN) .......................... 2016 1 1044987

(51) Int. Cl.
*G06F 3/038* (2013.01)
*G09G 5/00* (2006.01)
(Continued)

(52) U.S. Cl.
CPC ......... *G09G 3/3258* (2013.01); *G09G 3/3241* (2013.01); *G09G 3/3291* (2013.01); *G09G 2300/043* (2013.01); *G09G 2320/06* (2013.01)

(58) Field of Classification Search
CPC ... G09G 2300/0809; G09G 2300/0852; G09G 2300/0861; G09G 2310/08; G09G 3/204;
(Continued)

(56) References Cited

U.S. PATENT DOCUMENTS

| | | | |
|---|---|---|---|
| 9,196,197 | B2 | 11/2015 | Kim |
| 9,734,763 | B2 | 8/2017 | Sun |

(Continued)

FOREIGN PATENT DOCUMENTS

| | | | |
|---|---|---|---|
| CN | 103974115 A | 8/2014 | |
| CN | 203932065 U | 11/2014 | |

(Continued)

OTHER PUBLICATIONS

Chinese Office Action in Chinese Application No. 201611044987.2 dated Jul. 27, 2018 with English translation.

(Continued)

*Primary Examiner* — Insa Sadio
(74) *Attorney, Agent, or Firm* — Collard & Roe, P.C.

(57) ABSTRACT

A pixel circuit, a driving method of the pixel circuit, and a display panel, the pixel circuit includes a first sub-pixel circuit configured to write a first data voltage provided by the first data line under control of the first scan line, and generate a compensation voltage at the first node; at least one second sub-pixel circuit configured to perform threshold voltage compensation by the compensation voltage generated at the first node; the at least one second sub-pixel circuit is configured to write a second data voltage provided by the second data line under control of the second scan line based on a display mode.

20 Claims, 15 Drawing Sheets

(51) Int. Cl.

| | |
|---|---|
| ***G09G 3/3258*** | (2016.01) |
| ***G09G 3/3241*** | (2016.01) |
| ***G09G 3/3291*** | (2016.01) |

(58) Field of Classification Search

CPC .. G09G 3/3225; G09G 3/3258; G09G 3/3266; G09G 2320/0242; G09G 2320/028; G09G 3/3648

See application file for complete search history.

(56) References Cited

U.S. PATENT DOCUMENTS

| | | | | |
|---|---|---|---|---|
| 2013/0063457 | A1 | 3/2013 | Borgers et al. | |
| 2015/0002560 | A1* | 1/2015 | Kwon | G09G 3/3266 345/691 |
| 2015/0116383 | A1* | 4/2015 | Kim | G09G 3/3258 345/694 |
| 2016/0041668 | A1 | 2/2016 | Chaji | |

FOREIGN PATENT DOCUMENTS

| | | | |
|---|---|---|---|
| CN | 203950535 | U | 11/2014 |
| CN | 104252835 | A | 12/2014 |
| CN | 203982748 | U | 12/2014 |
| CN | 203982749 | U | 12/2014 |
| CN | 104318898 | A | 1/2015 |
| CN | 204117568 | U | 1/2015 |
| CN | 105247462 | A | 1/2016 |
| CN | 106504705 | A | 3/2017 |
| KR | 10-2016-0027583 | A | 3/2016 |
| WO | 2008/116011 | A1 | 9/2008 |

OTHER PUBLICATIONS

International Search Report of PCT/CN2017/090618 in Chinese, dated Sep. 20, 2017 with English translation.

Notice of Transmittal of the International Search Report of PCT/CN2017/090618 in Chinese, dated Sep. 20, 2017.

Written Opinion of the International Searching Authority of PCT/CN2017/090618 in Chinese, dated Sep. 20, 2017 with English translation.

* cited by examiner

PIXEL CIRCUIT AND DRIVING METHOD THEREOF, AND DISPLAY PANEL

CROSS REFERENCE TO RELATED APPLICATIONS

This application is the National Stage of PCT/CN2017/090618 filed on Jun. 28, 2017, which claims priority under 35 U.S.C. § 119 of Chinese Application No. 201611044987.2 filed on Nov. 24, 2016, the disclosure of which is incorporated by reference.

TECHNICAL FIELD

The present disclosure relates to the field of display technology, and more particularly to a pixel circuit, a driving method of the pixel circuit, and a display panel comprising the pixel circuit.

BACKGROUND

With the rapid development of display technology, the display panel adopting OLED (Organic Light-Emitting Diode) is one of the hot spots in the current research field of flat panel display. Compared with the existing LCD (liquid crystal display) panel, and the display panel adopting OLED has the advantages of low energy consumption, self-luminescence, wide viewing angle and fast response speed, achieving a match with an integrated circuit driver, and a wide working temperature adaptability, thin volume, and flexible display, and thus possessing a broad application prospect. Unlike TFT-LCD (Thin-Film Transistor Liquid Crystal Display) which uses a voltage to control luminance of light emitting diodes, OLED is current-driven and requires a steady current to control luminance of light emitting diodes. However, in the existing pixel driving circuit, threshold voltages of the driving TFTs driving the light emitting diodes in respective pixel dots have non-uniformity due to manufacturing process and device aging, which results in that even if the same driving voltage is applied to gates of the respective driving TFTs, the current flowing through the respective OLEDs can also be different, thus affecting the display effect.

In addition, when an image is displayed by the existing display screen, resolutions of respective areas are the same, it is impossible to dynamically adjust the resolution of a local area on the display panel in real time according to visual attention of the user.

SUMMARY

According to the principle of the present disclosure, there is provided a pixel circuit, a driving method of the pixel circuit, and a display panel. The pixel circuit can perform threshold voltage compensation on the driving transistor that drives the light emitting element to emit light for displaying, which removes the influence caused by drifting of the threshold voltage on the driving current of the driving transistor, so as to prevent inconsistency caused by non-uniformity of the threshold voltages of the respective driving transistors on light emitting display of the light emitting element.

According to an aspect of the present disclosure, there is provided a pixel circuit, comprising: a first sub-pixel circuit connected to a first data line, a first scan line and a first node, and configured to write a first data voltage provided by the first data line under control of the first scan line, and generate a compensation voltage at the first node; at least one second sub-pixel circuit connected to the first node, a second data line and a second scan line, and configured to perform threshold voltage compensation by using the compensation voltage generated at the first node; wherein the at least one second sub-pixel circuit is configured to write a second data voltage provided by the second data line under control of the second scan line based on a display mode.

The above pixel circuit according to the present disclosure can generate the compensation voltage at the first node by using the first sub-pixel circuit, so that not only threshold voltage compensation can be performed on the first sub-pixel circuit but also the compensation voltage can be provided to at least one second sub-pixel circuit, and therefore threshold voltage compensation can be performed on other sub-pixel circuits, which eliminates the influence on light emitting display of the light emitting element caused by drifting of the threshold voltage of the driving TFT in the sub-pixel circuit.

In addition, the above pixel circuit according to the present disclosure can write the first data voltage into the driving unit of the first sub-pixel circuit to drive the first light emitting element to emit light for displaying, and can write the second data voltage into the second sub-pixel circuit according to adjustment requirement of the display resolution, so that the driving unit of the second sub-pixel circuit drives the second light emitting element to emit light with a data voltage different from the first data voltage, and light emissions of the first light emitting element and the second light emitting element are combined to achieve different visual resolutions.

According to an aspect of the present disclosure, there is further provided a display panel comprising an OLED display array, wherein each OLED pixel can comprise the above pixel circuit; at least one sensor configured to detect eye movement of a user viewing an interface of the display panel and generate an eye movement detection signal; and a processor configured to determine an area on the interface to which the user focuses based on the eye movement detection signal and provide an active scan voltage to the second scan line, so as to write the second data voltage to the pixels in said area.

Optionally, the pixel array of the display panel can be partitioned, and the area of partitions can be determined according to specific viewing needs. With eye tracking technology, a position of an area on the screen to which human eyes focus is determined, and the area of focus is displayed at a higher resolution, while other areas of non-focus are displayed at a lower resolution. Specifically, eye movement of the user can be detected by a sensor, and the specific area viewed by the user can be determined, so as to achieve resolution differentiation of display areas. As the position where human eyes view changes, it is possible to switch among resolutions of areas at different positions, and the effect of adjustable resolution is truly achieved. Thereby, resolutions of the respective display areas can be dynamically adjusted in real time, and the display power consumption is reduced.

According to an embodiment of the present disclosure, there is further provided a method for driving the above pixel circuit, the method comprising: applying an active voltage level to the first scan line, writing the first data voltage on the first data line into the first sub-pixel circuit, generating the compensation voltage at the first node, and providing the compensation voltage to the second sub-pixel circuit to perform threshold voltage compensation; and applying an active voltage level to the second scan line, and writing the second data voltage on the second data line into the second sub-pixel circuit, based on a display mode.

According to the principle of the present disclosure, threshold voltage compensation performed on the driving transistor of the pixel circuit and smart displaying are combined, and resolution of the display panel can be adjusted in real time with respect to the focus of the user on the picture displayed by the display panel, so that the area of focus are displayed in richer color and in sharper detail, and the area of non-focus is displayed in a lower resolution, so that power consumption is reduced.

BRIEF DESCRIPTION OF THE DRAWINGS

In order to describe the technical solutions in the embodiments of the present disclosure more clearly, the following briefly introduces the accompanying drawings in the embodiments. Apparently, the accompanying drawings in the following description relate to only some embodiments of the present disclosure, and are not intended to limit the present disclosure.

DETAILED DESCRIPTION OF THE EMBODIMENTS

Hereinafter, the technical solutions in the embodiments of the present disclosure will be described clearly and comprehensively in combination with the accompanying drawings. Obviously, these described embodiments are merely parts of the embodiments of the present disclosure, rather than all of the embodiments thereof. Other embodiments obtained by a person of ordinary skill in the art based on the embodiments of the present disclosure without paying creative effort all fall into the protection scope of the present disclosure.

As described above, the driving TFT has a threshold voltage, and the threshold voltages Vth for the driving TFTs at respective pixel dots can be different due to manufacturing process; and after a long time of operation, the threshold voltage of the driving TFT also drifts, thereby causing luminance of the OLEDs at respective pixel dots to be non-uniformity, and affecting the display uniformity.

Figure 1:
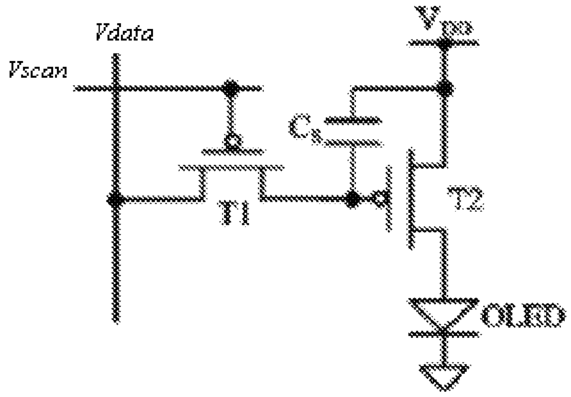
FIG. 1 illustrates a known 2T1C pixel circuit.

For example, FIG. 1 illustrates a known 2T1C pixel circuit comprising a driving TFT T2, a switching TFT T1 and a storage capacitor Cs. A gate of the switching TFT T1 is connected to a scan line Vscan, a source of the switching TFT T1 is connected to a data line Vdata, and a drain of the switching TFT T1 is connected to a gate of the driving TFT T2; a source of the driving TFT T2 is connected to a power supply voltage VDD, and a drain of the driving TFT T2 is connected to an anode of the OLED; a cathode of the OLED is grounded; the storage capacitor Cs is connected in parallel between the gate and the source of the driving TFT T2. At the time of starting to scan the pixel, when the scan line Vscan is at a low voltage level, T1 is turned on, and a data voltage Vdata provided on the data line is written into the storage capacitor Cs. When the scanning ends, Vscan becomes a high voltage level and T1 is turned off. The driving TFT T2 is turned on by the data voltage stored on the Cs, thereby driving the OLED to emit light.

The driving current of the driving TFT T2, that is, the working current of the OLED, can be expressed as $I_{OLED}=K(V_{GS}-V_{th})^2$, where $V_{GS}$ is a gate-source voltage of the driving transistor, $V_{th}$ is the threshold voltage of the driving transistor, K is a coefficient, which can be expressed as $$K=\mu\cdot C_{ox}\frac{W}{L},$$

here, μ is a carrier mobility, $C_{ox}$ is gate oxide capacitance, and W/L is a channel width to length ratio of the driving transistor.

As mentioned above, the threshold voltages Vth of the driving TFTs for the respective pixel dots may be different due to manufacturing process and device aging etc., and drifts along with the usage. As a result, even if the same gate-source voltage is applied to the driving transistor, the generated driving current, that is, the current flowing through the OLED, also varies due to the change of $V_{th}$, thereby affecting the display uniformity.

In view of the above, the present disclosure provides a pixel circuit capable of compensating for the threshold voltage of the driving TFT, which eliminates the influence caused by the threshold voltage of the driving TFT on the operating current for driving the OLED to emit light for displaying, thereby improving the display effect.

Figure 2:
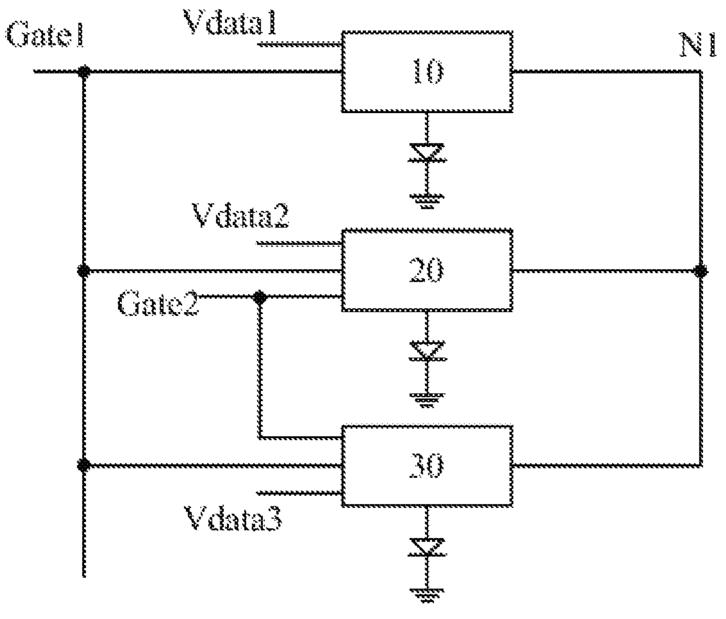
FIG. 2 is a schematic block diagram of a pixel circuit according to an embodiment of the present disclosure.

As illustrated in FIG. 2, according to an embodiment of the present disclosure, the pixel circuit comprises: a first sub-pixel circuit 10 connected to a first data line Vdata1, a first scan line Gate1 and a first node N1, and configured to drive a first light emitting element to emit light for displaying by using a first data voltage provided by the first data line Vdata1, and generate a compensation voltage at the first node N1 under control of the first scan line Gate1; and at least one second sub-pixel circuit, for example, sub-pixel circuits 20, 30, wherein the sub-pixel circuit 20 is connected to the first scan line Gate1, the first node N1, a corresponding second data line Vdata2 and a second scan line Gate2, and configured to drive a second light emitting element to emit light and perform threshold voltage compensation by using the compensation voltage generated at the first node N1; the sub-pixel circuit 30 is connected to the first scan line Gate1, the first node N1, the corresponding second data line Vdata3 and the second scan line Gate2, and configured to drive a third light emitting element to emit light and perform threshold voltage compensation by using the compensation voltage generated at the first node N1.

The above pixel circuit according to the present disclosure can generate the compensation voltage at the first node N1 by using the first sub-pixel circuit, so that not only threshold voltage compensation can be performed on the first sub-pixel circuit per se but also the compensation voltage can be provided to at least one second sub-pixel circuit, and therefore threshold voltage compensation can be performed on other sub-pixel circuits, which eliminates the influence on light emitting display of the light emitting element caused by drifting of the threshold voltage of the driving TFT in the sub-pixel circuit.

In addition, the above pixel circuit according to the present disclosure can adjust the display resolution as needed, wherein the first sub-pixel circuit drives the first light emitting element to emit light by using the first data voltage and the second sub-pixel circuit can be configured to drive the second light emitting element to emit light for displaying by using the first data voltage or a second data voltage different from the first data voltage, and light emissions of the first light emitting element and the second light emitting element are combined to achieve different visual resolutions.

Figure 3:
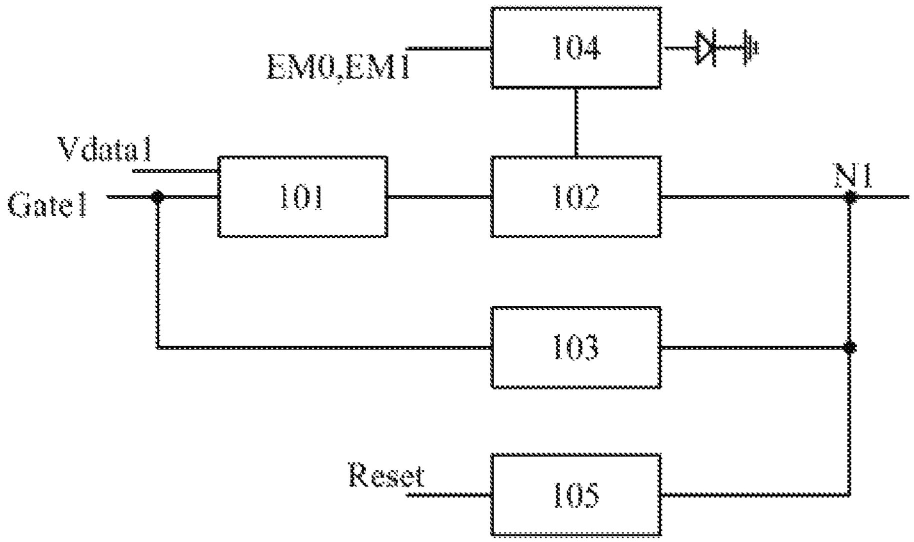
FIG. 3 is a schematic block diagram of a first sub-pixel circuit included in a pixel circuit according to an embodiment of the present disclosure.

Specifically, as illustrated in FIG. 3, in the above pixel circuit according to the present disclosure, the first sub-pixel circuit 10 comprises a first input unit 101 and a first driving unit 102, wherein the first input unit 101 is connected to the first data line Vdata1 and the first scan line Gate1, and configured to input the first data voltage provided by the first data line Vdata1 to the first driving unit 102 under control of the first scan line Gate1; the first driving unit 102 is connected to the first node N1, and configured to generate a current for driving a first light emitting element to emit light under control of the first node N1.

Optionally, as illustrated in FIG. 3, the first sub-pixel circuit further comprises a compensation voltage generating unit 103 connected to the first node N1, the first scan line Gate1 and the first driving unit 102, and configured to generate the compensation voltage at the first node N1 under control of the first scan line Gate1, wherein the compensation voltage can be used for performing threshold voltage compensation on the first driving unit 102 and can be provided to the second sub-pixel circuit connected thereto.

Optionally, the first sub-pixel circuit further comprises: a first light emitting control unit 104 connected to the first light emitting element, a first light emitting control signal terminal EM0, EM1 and the first driving unit 102, and configured to provide the driving current generated by the first driving unit 102 to the first light emitting element under control of the first light emitting control signal terminal.

Optionally, the first sub-pixel circuit further comprises a reset unit 105 connected to a reset signal terminal Reset and the first node N1, and configured to reset the first node N1 under control of a reset signal provided by the reset signal terminal Reset.

Figure 5:
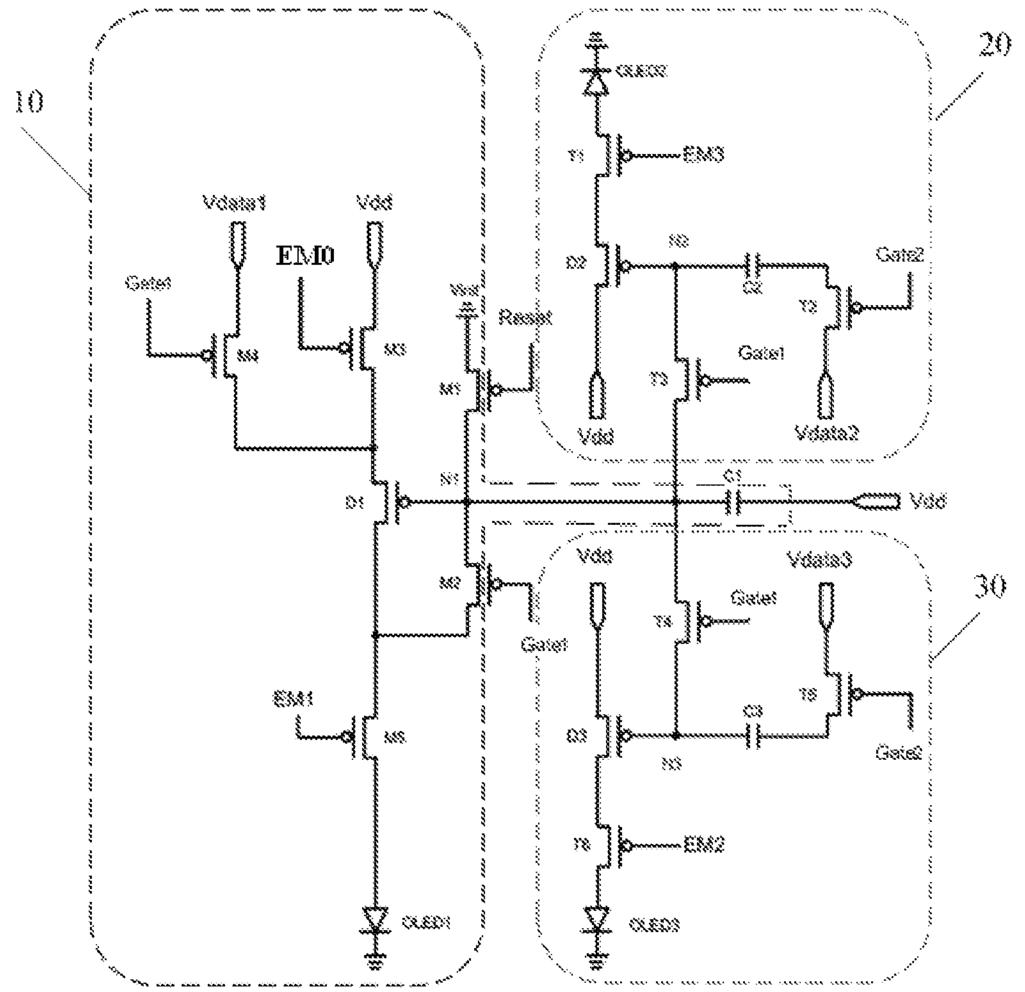
FIG. 5 illustrates a specific structure of a pixel circuit according to an embodiment of the present disclosure.

The specific structure of the first sub-pixel circuit according to an embodiment of the present disclosure will be described in detail below with reference to FIG. 5. As illustrated in FIG. 5, optionally, the first input unit 101 comprises a first input transistor M4, and the first driving unit 102 comprises a first driving transistor D1; a gate of the first input transistor M4 is connected to the first scan line Gate1, a first electrode of the first input transistor M4 is connected to the first data line Vdata1, and a second electrode of the first input transistor M4 is connected to a first electrode of the first driving transistor D1; a gate of the first driving transistor D1 is connected to the first node N1, and a second electrode of the first driving transistor D1 outputs the current for driving the first light emitting element to emit light.

Optionally, as illustrated in FIG. 5, the compensation voltage generating unit 103 comprises: a first compensation transistor M2, a gate of the first compensation transistor M2 being connected to the first scan line Gate1, a first electrode of the first compensation transistor M2 being connected to the first node N1, and a second electrode of the first compensation transistor M2 being connected to an output terminal of the first driving unit 102; and a first compensation capacitor C1, a first terminal of the first compensation capacitor C1 being connected to the first node N1, and a second terminal of the first compensation capacitor C1 being connected to a first voltage terminal Vdd.

Optionally, as illustrated in FIG. 5, the first light emitting control unit 104 comprises: a first light emitting control transistor M3, a gate of the first light emitting control transistor M3 being connected to the first light emitting control terminal EM0, a first electrode of the first light emitting control transistor M3 being connected to the first voltage terminal Vdd, and a second electrode of the first light emitting control transistor M3 being connected to an input terminal of the first driving unit 102; and a second light emitting control transistor M5, a gate of the second light emitting control transistor M5 being connected to the first light emitting control terminal EM1, a first electrode of the second light emitting control transistor M5 being connected to the output terminal of the first driving unit 102, and a second electrode of the second light emitting control transistor M5 being connected to the first light emitting element.

Optionally, as illustrated in FIG. 5, the reset unit comprises a reset transistor M1, a gate of the reset transistor M1 being connected to the reset signal terminal Reset, a first electrode of the reset transistor M1 being connected to a second voltage terminal Vinit, and a second electrode of the reset transistor M1 being connected to the first node N1.

Figure 4:
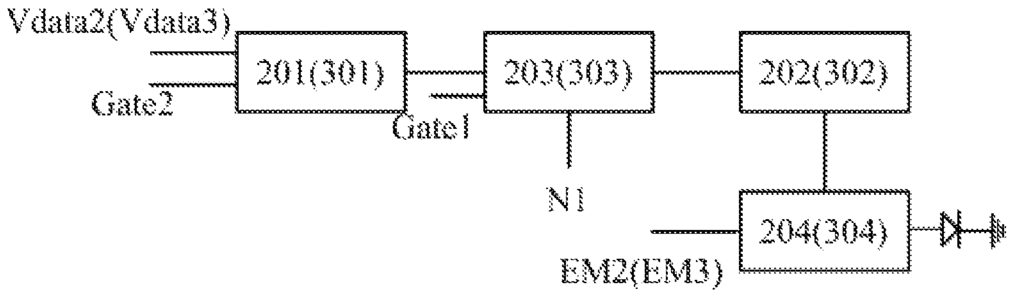
FIG. 4 is a schematic block diagram of at least one second sub-pixel circuit included in a pixel circuit according to an embodiment of the present disclosure.

The structure of the second sub-pixel circuit according to an embodiment of the present disclosure will be described below with reference to FIGS. 4 and 5. As illustrated in FIG. 4, each second sub-pixel circuit, for example, each of the sub-pixel circuits 20, 30 illustrated in FIG. 2, comprises a second input unit 201/301 and a voltage compensation unit 203/303; the second input unit 201/301 is connected to the second data line Vdata2/Vdata3 and the second scan line Gate2, and configured to input the second data voltage provided by the second data line Vdata2/Vdata3 to the voltage compensating unit under control of the second scan line Gate2; the voltage compensating unit 203/303 is connected to the first node N1 and the first scan line Gate1, and configured to write the compensation voltage generated at the first node N1 under control of the first scan line Gate1.

Optionally, as illustrated in FIG. 4, the second sub-pixel circuit 20/30 further comprises: a second driving unit 202/302 connected to the voltage compensating unit 203/303, and configured to perform threshold voltage compensation by using the compensation voltage written by the voltage compensating unit and generate a current for driving the second light emitting element OLED2/OLED3 to emit light.

Optionally, as illustrated in FIG. 4, the second sub-pixel circuit 20/30 further comprises: a second light emitting control unit 204/304 connected to the second light emitting element, a second light emitting control signal terminal EM2/EM3 and the second driving unit 202/302, and configured to provide the driving current generated by the second driving unit 202/302 to the second light emitting element OLED2/OLED3 under control of the second light emitting control signal terminal EM2/EM3.

The specific structure of the second sub-pixel circuit 20, 30 according to an embodiment of the present disclosure will be described in detail below with reference to FIG. 5. As illustrated in FIG. 5, the second input unit comprises a second input transistor T2/T5, a gate of the second input transistor T2/T5 being connected to the second scan line Gate2, a first electrode of the second input transistor T2/T5 being connected to the second data line Vdata2/Vdata3, and a second electrode of the second input transistor T2/T5 being connected to the voltage compensating unit.

Optionally, as illustrated in FIG. 5, the voltage compensating unit comprises: a second compensation transistor T3/T4, a gate of the second compensation transistor T3/T4 being connected to the first scan line Gate1, a first electrode of the second compensation transistor T3/T4 being connected to the first node N1, and a second electrode of the second compensation transistor T3/T4 being connected to the second driving unit; and a second compensation capacitor C2/C3, a first terminal of the second compensation capacitor C2/C3 being connected to the second electrode of the second compensation transistor T2/T3, and a second terminal of the second compensation capacitor C2/C3 being connected to the output terminal of the second input unit.

Optionally, as illustrated in FIG. 5, the second driving unit comprises a second driving transistor D2/D3, a gate of the second driving transistor D2/D3 is connected to an output terminal of the voltage compensating unit, a first electrode of the second driving transistor is connected to the first voltage terminal Vdd, and a second electrode of the second driving transistor outputs the current for driving the second light emitting element to emit light.

Optionally, as illustrated in FIG. 5, the second light emitting control unit comprises a third light emitting control transistor T1/T6, a gate of the third light emitting control transistor being connected to the second light emitting control terminal EM2/EM3, a first electrode of the third light emitting control transistor being connected to an output terminal of the second driving unit, and a second electrode of the third light emitting control transistor being connected to the second light emitting element.

In the above embodiment of the present disclosure, since there is a compensation voltage generating unit in the first sub-pixel circuit, a compensation voltage is generated at the first node, so that threshold voltage compensation can be performed on the driving transistor in the first sub-pixel circuit, and the compensation voltage can be provided to the second sub-pixel circuit via the first node N1, and threshold voltage compensation is performed on the driving transistor in the second sub-pixel circuit via the voltage compensating unit in the second sub-pixel circuit, and thereby the effect caused by the threshold voltage of the driving transistor on the light emitting element during light emission can be removed, the display effect can be enhanced.

In addition, the first light emitting element is driven to emit light for displaying by providing the first sub-pixel circuit with the first data voltage, and the second data voltage can be provided to the second sub-pixel circuit according to requirement of the display resolution to adjust a display grayscale of the second light emitting element, so as to dynamically adjust the visual resolution resulted from the synthesization of the first sub-pixel and the second sub-pixel in real time.

Optionally, in the above embodiment, the display device is an OLED.

Optionally, in the pixel circuit illustrated in FIG. 5, all the transistors are P-type TFTs (Thin Film Transistor), thereby reducing the manufacturing process of the module and improving the production efficiency. However, some or all of the transistors can also adopt N-type TFTs as needed, as long as the voltage levels of the related control signals are adjusted accordingly, the specific connection relationship is omitted herein.

Optionally, in the present disclosure, except that the gate of the transistor serves as a control electrode thereof, the first electrode of the transistor can be a source for inputting a signal, and the second electrode of the transistor can serve as a drain for outputting a signal. However, taking into account symmetry of the source and the drain of the transistor, it is possible to interchange the first and second electrodes without affecting the technical solution of the present disclosure.

The specific structure of the pixel circuit according to an embodiment of the present disclosure is described above with reference to FIGS. 3 to 5. The operating states of the pixel circuit according to the above embodiment of the present disclosure in respective periods in a high resolution display mode will be described in detail below with reference to FIGS. 6 to 10. The TFTs in the dashed boxes in FIGS. 7 to 10 represent the TFTs that are turned off, and the arrows represent the current flow in respective periods.

As an example, the first light emitting control signal terminals EM0, EM1 of the first sub-pixel circuit in FIG. 5 and the second light emitting control signal terminal EM2/EM3 of the second sub-pixel circuit are connected to the same light emitting control signal EM. Of course, the respective light emitting control signal terminals can also be connected to different light emitting control signals according to needs, no limitation is made herein, as long as the principle of the present disclosure can be implemented.

Figure 6:
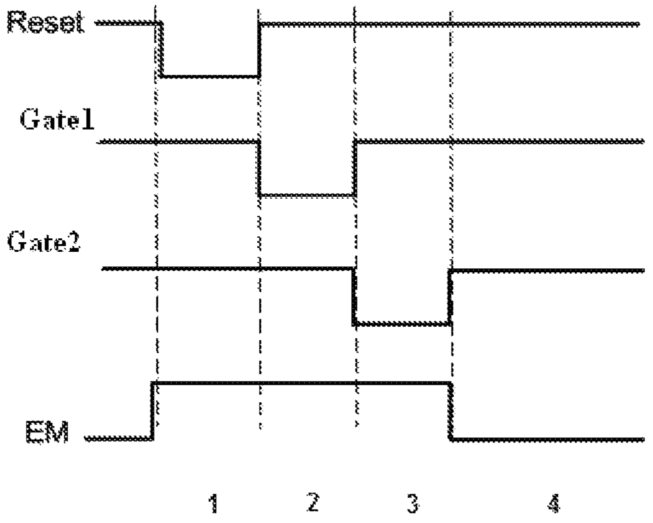
FIG. 6 illustrates a schematic signal timing applicable to the pixel circuit illustrated in FIG. 5 in a high resolution display mode according to an embodiment of the present disclosure.
Figure 7:
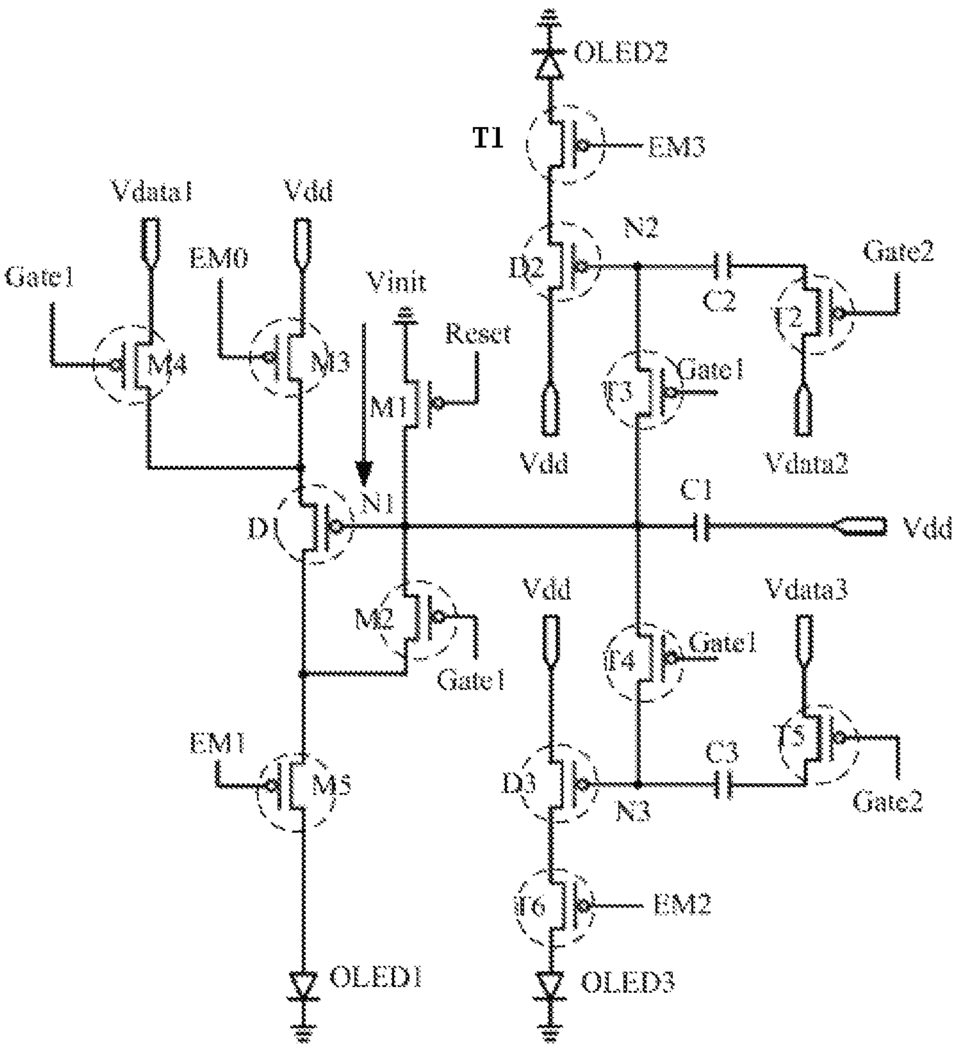
FIGS. 7 to 10 illustrate operating states in respective periods when the signal timings illustrated in FIG. 6 is applied to the pixel circuit illustrated in FIG. 5 according to an embodiment of the present disclosure.

In the first period illustrated in FIG. 6, a low voltage level signal is applied to the reset signal terminal, a high voltage level signal is applied to the first scan signal line and the second scan signal line, and a high voltage level signal is applied to the first and second light emitting control signal terminals. Therefore, as illustrated in FIG. 7, the reset transistor M1 in the first sub-pixel circuit is turned on and the other transistors in the pixel circuit are turned off, the voltage level at the first node N1 is reset to a potential Vinit in this process, so as to initialize the potential at the first node, this period represents the reset period of the pixel circuit.

Figure 8:
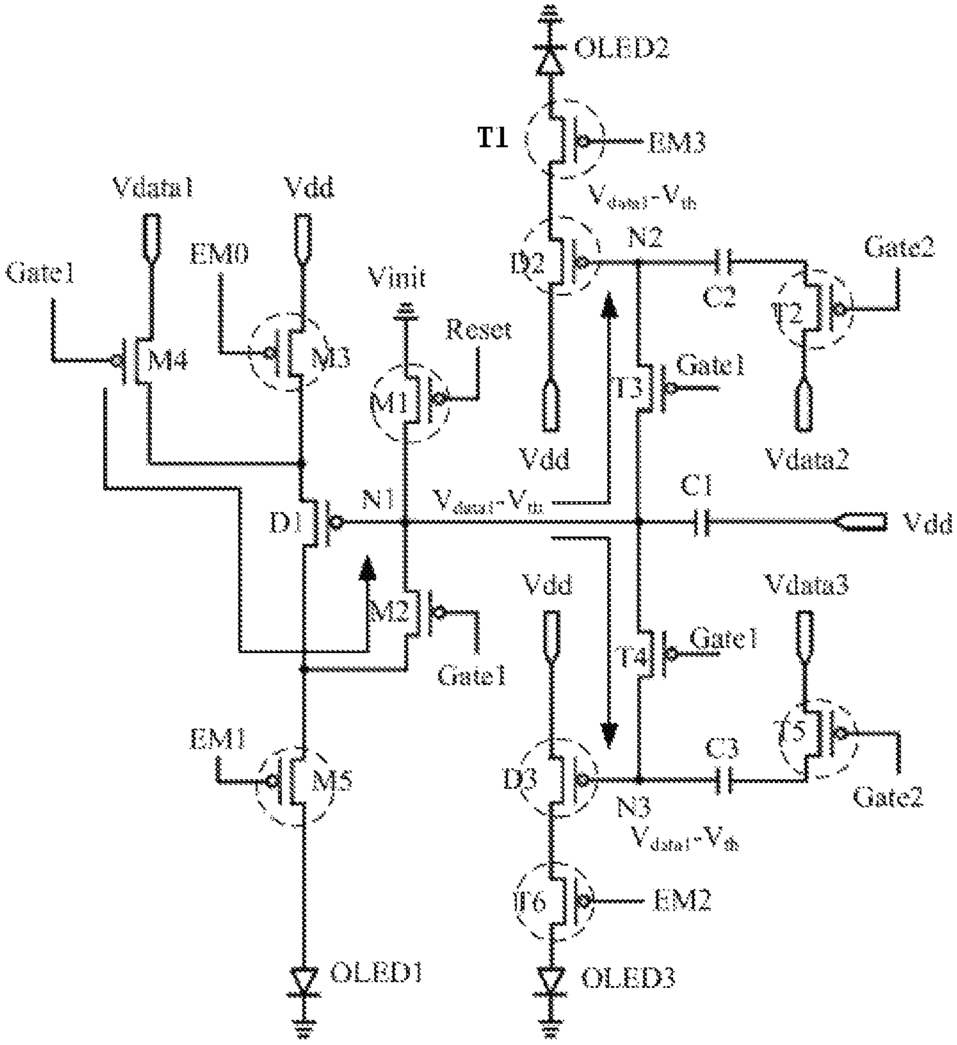

In the second period illustrated in FIG. 6, the signal applied to the reset signal terminal is changed to a high voltage level, the signal applied to the first scan signal line is changed to a low voltage level, a high voltage level signal continues to be applied to the second scan signal line, a high voltage level signal continues to be applied to the first and the second light emitting control signal terminals. Therefore, as illustrated in FIG. 8, the reset transistor M1 in the first sub-pixel circuit is turned off, the input transistor M4 and the first compensation transistor M2 are turned on since their gates are applied with a low voltage level, and the driving transistor is turned on since its gate is reset at a low voltage level Vinit in the previous period, the signal Vdata1 starts charging the first node N1 after flowing through the transistor M4→D1→M2, until the first node N1 is charged to be Vdata1−Vth, where Vth represents the threshold voltage of the driving transistor D1. Since the first terminal of the first compensation capacitor C1 is connected to the first node N1, the potential at the first terminal of the first compensation capacitor C1 is charged to Vdata1−Vth, and the second terminal of the first compensation capacitor C1 is connected to the first voltage terminal Vdd. Since the gates of the second compensation transistors T3, T4 in the two second sub-pixel circuits 20, 30 are connected to the first scan line and are applied with a low voltage level signal, the transistors T3, T4 are turned on, and the potentials at the nodes N2, N3 are also charged to Vdata1−Vth. This period represents the charging period of the pixel circuit and also is the first data voltage writing period of the pixel circuit.

Figure 9:
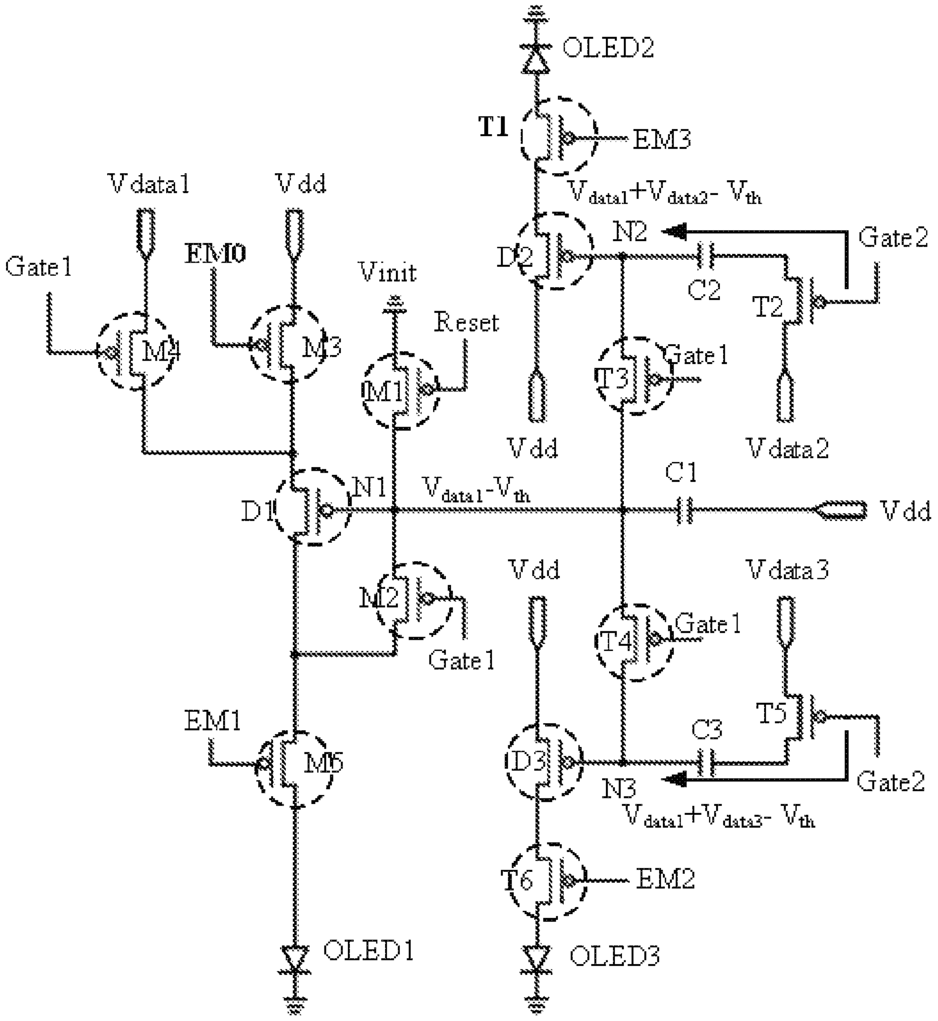

In the third period illustrated in FIG. 6, the signal applied to the first scan signal line is changed to a high voltage level, the signal applied to the second scan signal line is changed to a low voltage level, and the first and second light emitting control signal terminals continue to be applied with a high voltage signal. Therefore, as illustrated in FIG. 9, the input transistor M1 and the first compensation transistor M2 in the first sub-pixel circuit are turned off, the second compensation transistors T3, T4 in the second sub-pixel circuits 20, 30 are turned off, and the second input transistors T2, T5 in the second sub-pixel circuits 20, 30 are turned on, and the second data voltages Vdata2, Vdata3 are provided to the second terminals of the second compensation capacitors C2, C3, respectively. Due to floating of the nodes N2, N3, potentials at the first terminals of the second compensation capacitors C2, C3 respectively connected to the nodes N2, N3 changed to Vdata1−Vth+Vdata2 and Vdata1−Vth+Vdata3 respectively based on the bootstrap effect of capacitance, so as to ensure that a potential difference across two terminals of the second compensation capacitors C2, C3 does not change. This period represents the floating transition process of nodes N2, N3, that is, the second data voltage writing period of the pixel circuit.

In each of the above periods, no current flows through the OLED1 due to turn-off of the light emitting control transistors M3, M5, indirectly reducing lifetime loss of the OLED and ensuring the display quality.

Similarly, in the above respective periods, since the light emitting control transistors T1, T6 are turned off, it is ensured that no current flows through the OLED 2 and the OLED 3 other than during the light emitting period, indirectly reducing lifetime loss of the OLED and ensuring the display quality.

Figure 10:
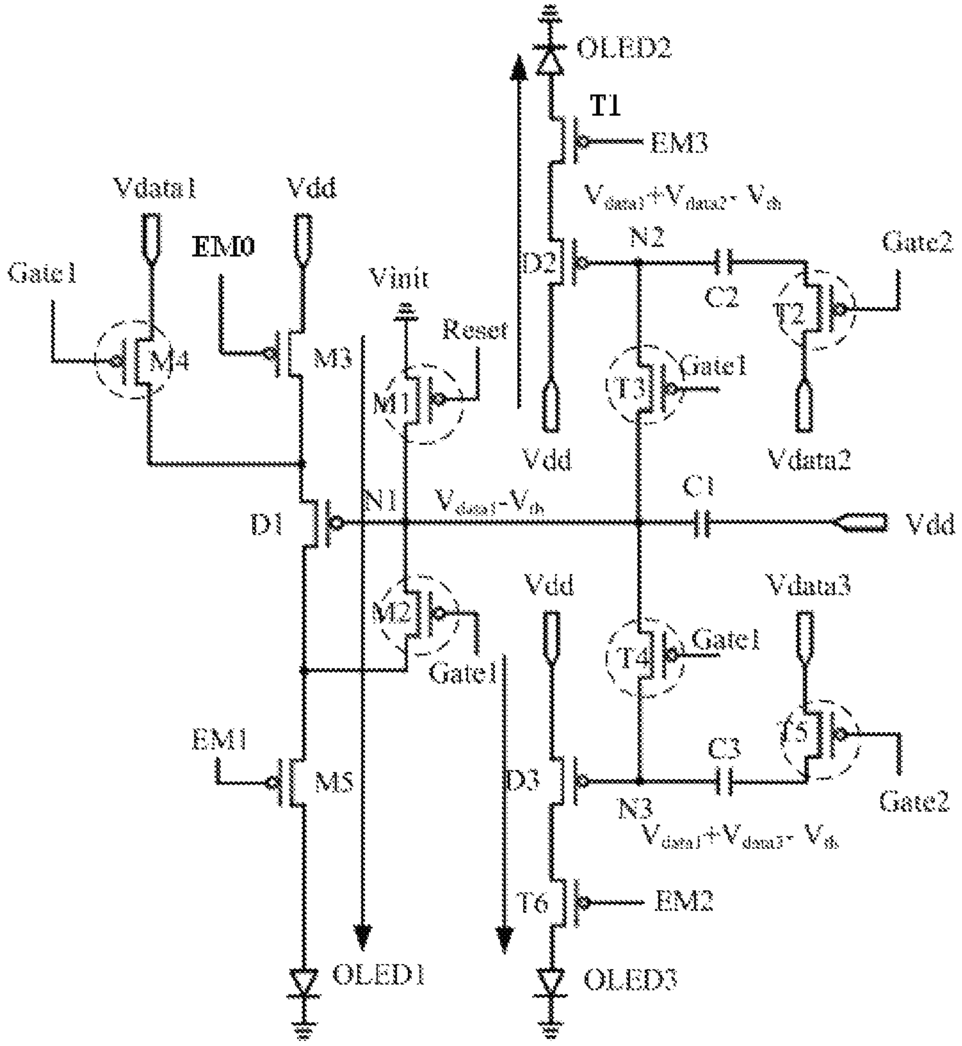

A fourth period illustrated in FIG. 6 is a period in which the pixel circuit drives the light emitting element to emit light for displaying. In the fourth period, the signal applied to the second scan signal line is changed to a high voltage level, and the signal applied to the first and second light emitting control signal terminals is changed to a low voltage level. Therefore, as illustrated in FIG. 10, the second input transistors T2, T5 in the second sub-pixel circuits 20, 30 are turned off; the first light emitting control transistor M3 and the second light emitting control transistor M5 in the first sub-pixel circuit are turned on, a current path M3→D1→M5 is formed, and the first light emitting element OLED1 is driven to start emitting light for displaying.

The driving current generated by the first driving transistor D1 can be expressed by the following formula (1)

$$\mathrm{IOLED1}=K(V_{GS}-Vth)^2=K[Vdd-(V\mathrm{data1}-Vth)-Vth]^2=K(Vdd-V\mathrm{data1})^2 \quad (1)$$

As can be seen from the above formula (1), the driving current IOLED1 is no longer affected by the threshold voltage Vth of the driving transistor, and is only related to the power supply voltage Vdd provided by the first voltage terminal and the first data voltage Vdata1 previously written. Therefore, the influence caused by drifting of the threshold voltage Vth of the driving TFT due to manufacturing process and long-time operation on the driving current IOLED1 outputted by the driving transistor is eliminated, uniformity of the light emitting display of the respective OLEDs can be ensured, and the display quality can be improved.

Meanwhile, as for the second sub-pixel circuit 20, the third light emitting control transistor T1 therein is turned on under the light emitting control signal of a low voltage level, and the driving current generated by the second driving transistor D2 can be represented by the following formula (2)

$$\mathrm{IOLED2}=K(V_{GS}-Vth)^2=K[Vdd-(V\mathrm{data1}+V\mathrm{data2}-Vth)-Vth]^2=K(Vdd-V\mathrm{data1}-V\mathrm{data2})^2 \quad (2)$$

It is noted that the driving current IOLED2 generated by the second driving transistor D2 is no longer affected by the threshold voltage Vth of the driving transistor D2, and it is only related to the power supply voltage Vdd provided by the first voltage terminal, the first data voltage Vdata1 written previously and the data voltage Vdata2. Therefore, the influence caused by drifting of the threshold voltage Vth of the driving TFT due to manufacturing process and long-time operation on the driving current IOLED2 outputted by the driving transistor is eliminated, uniformity of the light emitting display of the respective OLEDs can be ensured, and the display quality can be improved.

Similarly, as for the second sub-pixel circuit 30, the third light emitting control transistor T6 therein is turned on under the light emitting control signal of a low voltage level, and the driving current generated by the second driving transistor D3 can be expressed as the following formula (3):

$$\mathrm{OLED3}=K(V_{GS}-Vth)^2=K[Vdd-(V\mathrm{data1}+V\mathrm{data3}-Vth)-Vth]^2=K(Vdd-V\mathrm{data1}-V\mathrm{data3}) \quad (3)$$

As can be seen, when the first sub-pixel circuit and the second sub-pixel circuit drive the light emitting element to perform light emitting display after threshold voltage compensation, the outputted driving current is no longer affected by the threshold voltage of the driving transistor, and uniformity of light emitting display of the respective pixels is improved. It is noted that in the above embodiment, it is assumed that the threshold voltages of the driving transistors D1 to D3 are equal. In fact, the manufacturing uniformity of the silicon-based backboard TFT is relatively good, based on the principle of electron mirror, it can be considered that the threshold voltages Vth of the respective driving transistors D1, D2, D3 are substantially the same.

In addition, in this embodiment of the present disclosure, since the data voltages written into the respective sub-pixel circuits are different from each other, the light emitting currents of the light emitting elements OLED1, OLED2, OLED3 are different and by combining the light emitting display of OLED1, OLED2, OLED3, richer grayscale information can be displayed, and visual resolution can be improved.

Figure 12:
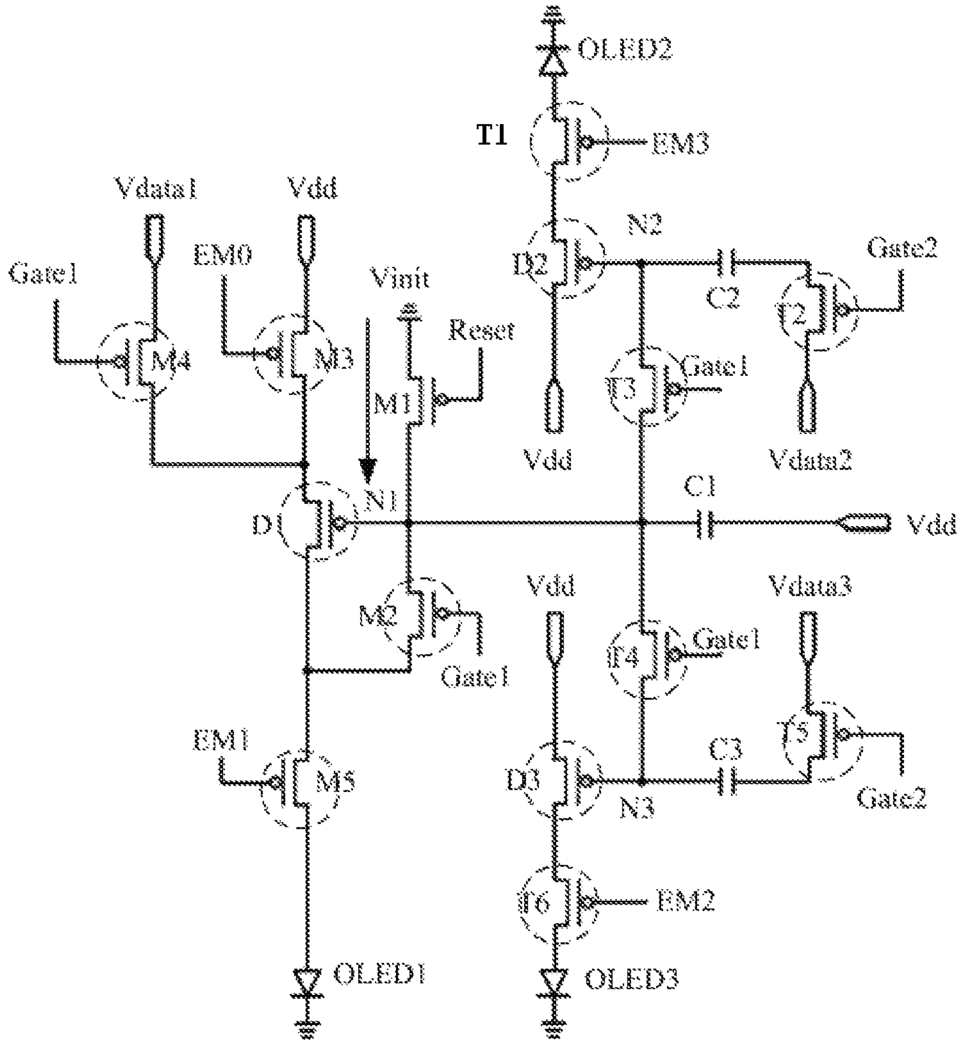
FIGS. 12 to 14 illustrates operating states in respective periods when the signal timings illustrated in FIG. 11 is applied to the pixel circuit illustrated in FIG. 5 according to an embodiment of the present disclosure.
Figure 13:
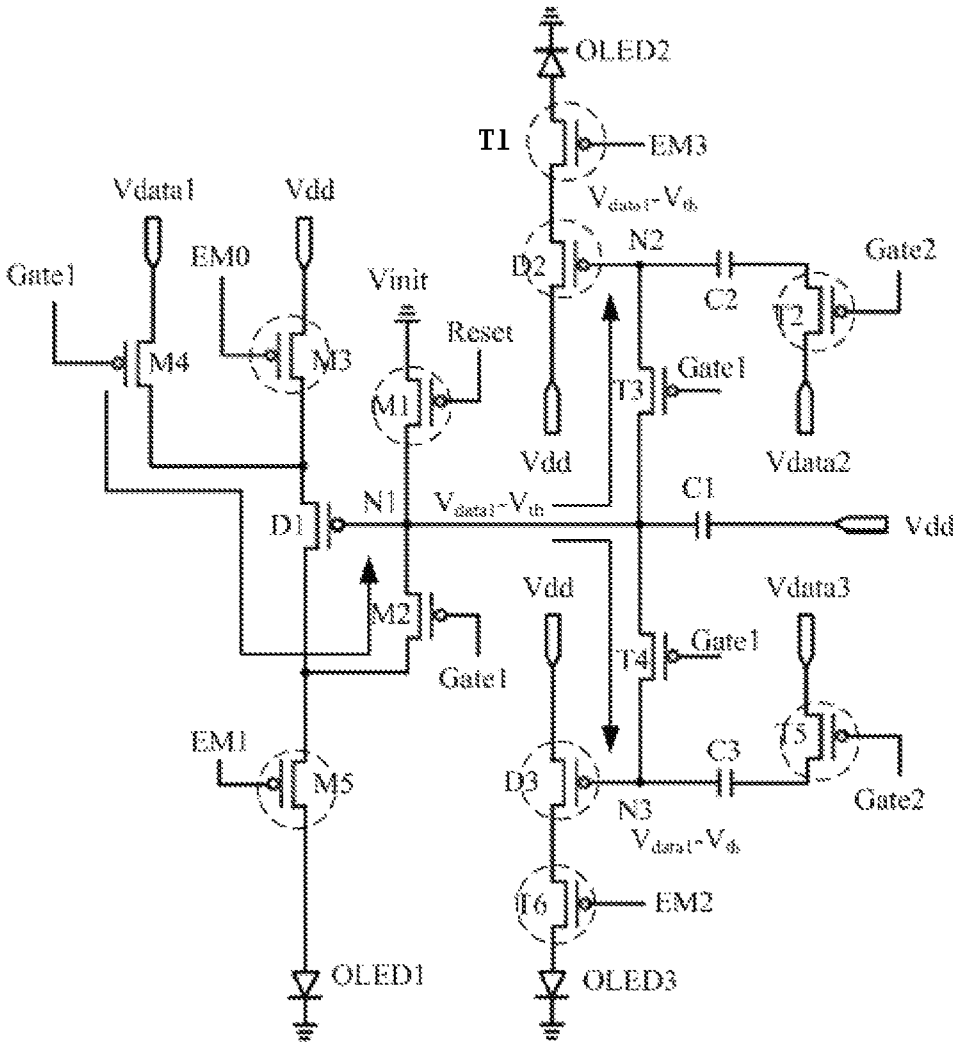
Figure 14:
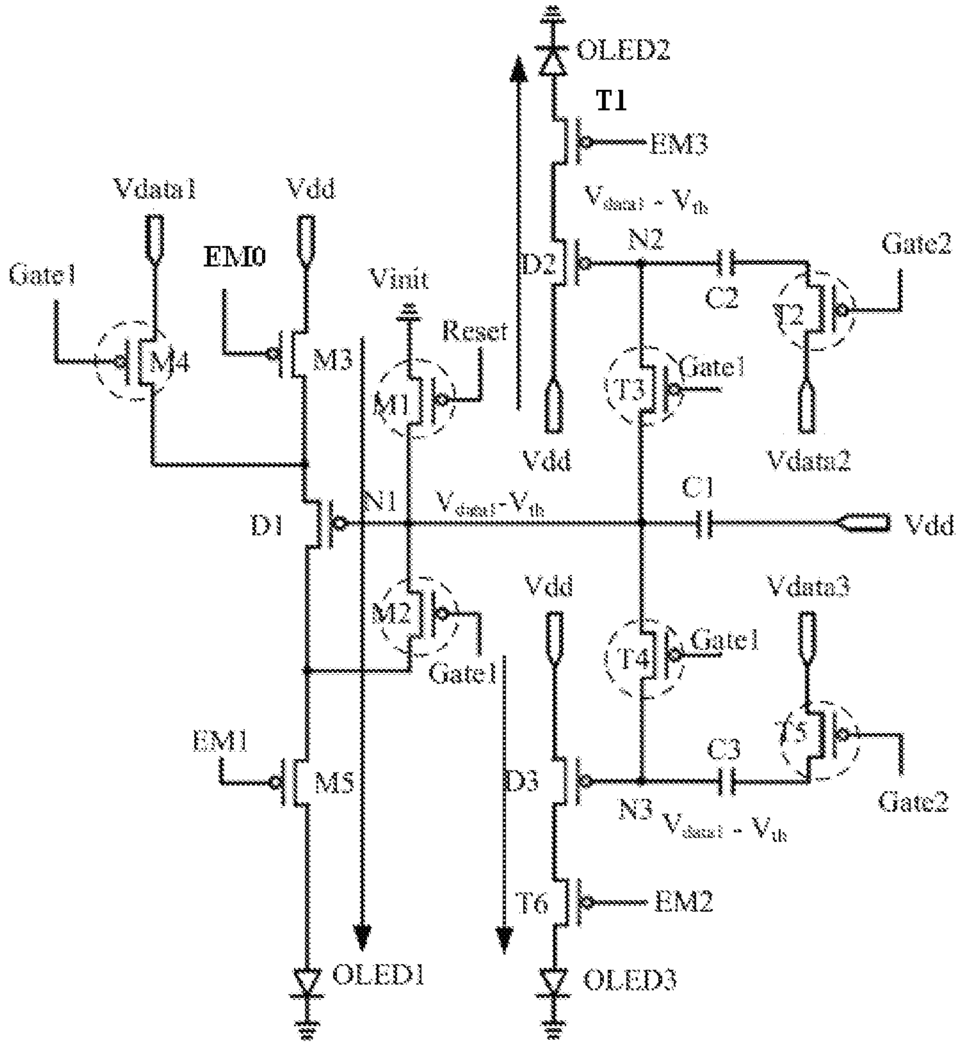

The operating states of the pixel circuit according to the above embodiment of the present disclosure in respective periods in a low resolution display mode will be described in detail below with reference to FIGS. 11 to 14. The TFTs in the dashed boxes in FIGS. 12 to 14 represent the TFTs that are turned off, and the arrows represent the current flow in each period.

As an example, the first light emitting control signal terminal EM0, EM1 of the first sub-pixel circuit in FIG. 5 and the second light emitting control signal terminal EM2/EM3 of the second sub-pixel circuit are connected to the same light emitting control signal EM. Of course, the respective light emitting control signal terminals can also be connected to different light emitting control signals according to needs, no limitation is made herein, as long as the principle of the present disclosure can be implemented.

Figure 11:
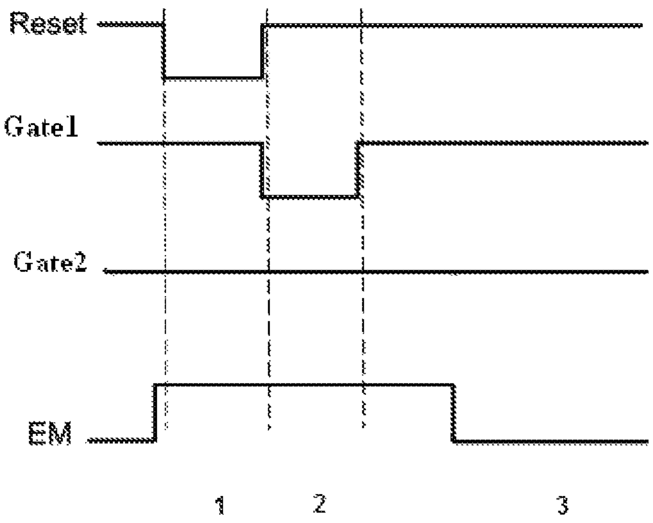
FIG. 11 illustrates a schematic signal timing applicable to the pixel circuit illustrated in FIG. 5 in a low resolution display mode according to an embodiment of the present disclosure.

In the first period illustrated in FIG. 11, a low voltage level signal is applied to the reset signal terminal, a high voltage level signal is applied to the first scan signal line and the second scan signal line, and a high voltage level signal is applied to the first and second light emitting control signal terminals. Therefore, as illustrated in FIG. 12, the reset transistor M1 in the first sub-pixel circuit is turned on, and the other transistors in the pixel circuit are turned off, so that the voltage level at the first node N1 is reset to a potential Vinit during this process, so as to initialize the potential at the first node; this period represents the reset period of the pixel circuit.

In the second period illustrated in FIG. 11, the signal applied to the reset signal terminal is changed to a high voltage level, the signal applied to the first scan signal line is changed to a low voltage level, a high voltage level signal continues to be applied to the second scan signal line, and a high voltage level signal continues to be applied to the first and second light emitting control signal terminals. Therefore, as illustrated in FIG. 13, the reset transistor M1 in the first sub-pixel circuit is turned off, the input transistor M4 and the first compensating transistor M2 are turned on because their gates are applied with a low voltage level, and the driving transistor is turned on because its gate is reset to a low voltage level Vinit in the previous period. The signal Vdata1' starts to charge the first node N1 through the transistor M4→D1→M2, until the first node N1 is charged to Vdata1'−Vth, where Vth represents the threshold voltage of the driving transistor D1. Since the first terminal of the first compensation capacitor C1 is connected to the first node N1, the potential at the first terminal of the first compensation capacitor C1 is charged to Vdata1'−Vth, and the second terminal of the first compensation capacitor C1 is connected to the first voltage terminal Vdd. Since the gates of the second compensation transistors T3, T4 in the two second sub-pixel circuits 20, 30 are connected to the first scan line and are applied with a low voltage level signal, the transistors T3, T4 are turned on, and the potentials at the nodes N2, N3 are also charged to Vdata1'−Vth. This period represents the charging period of the pixel circuit and also the first data voltage writing period of the pixel circuit.

In the above respective periods, no current flows through the OLED 1 due to turn-off of the light emitting control transistors M3, M5, which indirectly reduces lifetime loss of the OLED and ensures the display quality.

Similarly, in the above respective periods, since the light emitting control transistors T1, T6 are turned off, it is ensured that no current flows through OLED 2 and OLED 3 other than during the light emitting period, which indirectly reduces lifetime loss of the OLED and ensures the display quality.

Unlike what is illustrated in FIG. 6, there is no case where the second scan signal is changed to a low voltage level in the timings illustrated in FIG. 11. In other words, there is no period of writing the second data voltage to the pixel circuit in the operating period of the pixel circuit illustrated in FIGS. 12 to 14. After writing the first data voltage into the pixel circuit, the first sub-pixel circuit and the second sub-pixel circuit can be controlled to respectively drive the light emitting elements to emit light.

The third period illustrated in FIG. 11 is a period in which the pixel circuit drives the light emitting element to emit light for displaying. In the third period, the signals applied to the first and second light emission control signal terminals are changed to a low voltage level. Therefore, as illustrated in FIG. 14, the first light emitting control transistor M3 and the second light emitting control transistor M5 in the first sub-pixel circuit are turned on to form a current path M3→D1→M5 to drive the first light emitting element OLED1 to start to emit light for displaying.

The driving current generated by the first driving transistor D1 can be expressed by the following formula (4)

$$IOLED1=K(V_{GS}-Vth)^2=K[Vdd-(Vdata1'-Vth)-Vth]^2=K(Vdd-Vdata1')^2 \quad (4)$$

As can be seen from the above formula (4), the driving current IOLED1 is no longer affected by the threshold voltage Vth of the driving transistor, and is only related to the power supply voltage Vdd provided by the first voltage terminal and the first data voltage Vdata1' previously written. Therefore, the influence caused by drifting of the threshold voltage Vth of the driving TFT due to manufacturing process and long-time operation on the driving current IOLED1 outputted by the driving transistor is eliminated, uniformity of the light emitting display of the respective OLEDs can be ensured, and the display quality can be improved.

Meanwhile, as for the second sub-pixel circuit 20, in the previous second period, the node N2 is charged to a potential equal to that at the first node N1, and in the third period, the third light emitting control transistor T1 is turned on under a light emitting control signal at a low voltage level, and the driving current generated by the second driving transistor D2 can be expressed by the following formula (5)

$$IOLED2=K(V_{GS}-Vth)^2=K[Vdd-(Vdata1'-Vth)-Vth]^2=K(Vdd-Vdata1')^2 \quad (5)$$

As can be seen, the driving current generated by the second driving transistor D2 is equal to the driving current generated by the first driving transistor D1 and is also no longer affected by the threshold voltage Vth of the driving transistor D2 and only related to the power supply Vdd provided by the first voltage terminal and the first data voltage Vdata1' previously written. Therefore, the influence caused by drifting of the threshold voltage Vth of the driving TFT due to manufacturing process and long-time operation on the driving current IOLED2 outputted by the driving transistor is eliminated, uniformity of the light emitting display of the respective OLEDs can be ensured, and the display quality can be improved.

Similarly, as for the second sub-pixel circuit 30, in the previous second period, the node N3 is charged to a potential equal to that at the first node N1, and in the third period, the third light emitting control transistor T6 is turned on under a light emitting control signal at a low voltage level, and the driving current generated by the second driving transistor D3 can be expressed by the following formula (6):

$$IOLED2=K(V_{GS}-Vth)^2=K[Vdd-(Vdata1'-Vth)-Vth]^2=K(Vdd-Vdata1')^2 \quad (6)$$

As can be seen, when the first sub-pixel circuit and the second sub-pixel circuit drive the light emitting element to perform light emitting display after threshold voltage compensation, the outputted driving current is no longer affected by the threshold voltage of the driving transistor, uniformity of the light emitting display of the respective OLEDs are improved.

In this embodiment of the present disclosure, since the data voltages written to the respective sub-pixel circuits are the same as each other, the light emitting currents of the light emitting elements OLED1, OLED2, OLED3 are the same, and light emitting display synthesized by OLED1, OLED2 and OLED3 can provide a relatively low visual resolution.

Optionally, in the pixel circuit of the above embodiment, red can be displayed by using the first sub-pixel circuit 10, green and blue can be respectively displayed by using the two second sub-pixel circuits 20, 30, so as to synthesize three primary colors RGB of one pixel. However, the principle of the present disclosure is not limited thereto. In fact, in addition to displaying the red color by using the first pixel circuit 10, three second sub-pixel circuits 20, 30, 40 can be included in the pixel circuit to respectively display green, blue and yellow, or respectively display green, blue and white, according to display requirement, thus enriching display colors and enhancing the picture quality.

Figure 17A:
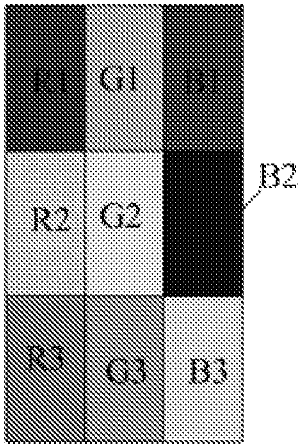
FIGS. 17A to 17B illustrate the principle of using a combination of sub-pixels to achieve the adjustable resolution of the display image.
Figure 17B:
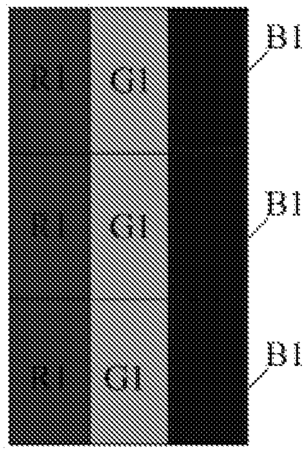

Optionally, in the pixel circuit of the above embodiment, for example, as illustrated in FIG. 17A, in one pixel, the first sub-pixel circuit 10 and the second sub-pixel circuits 20, 30 can be used to all display red, when displaying with a higher resolution, since the differences of the data voltage written into the respective sub-pixel circuits cause the displayed grayscale voltages to be different, reds R1, R2, R3 corresponding to different chromaticity are thereby displayed; whereas when displaying with a lower resolution, as illustrated in FIG. 17B, the first sub-pixel circuit 10 and the second sub-pixel circuits 20, 30 all display red R0 of the same chromaticity. Thereafter, one basic pixel can be formed by using three sub-pixel circuit units (RGB) or four sub-pixel circuit units (RGBW/RGBY).

Figure 15:
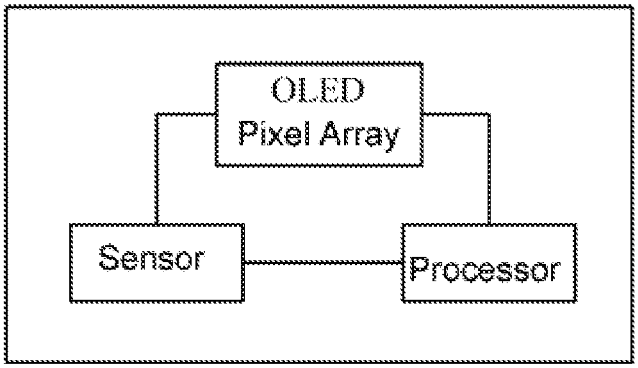
FIG. 15 illustrates a block diagram of a display panel according to an embodiment of the present disclosure.

According to an aspect of the present disclosure, a display panel is further provided. As illustrated in FIG. 15, the display panel comprises: an OLED pixel array in which each OLED pixel can be configured by the pixel circuit described above; at least one sensor configured to detect eye movement of a user viewing an interface of the display panel and generate an eye movement detection signal; and a processor configured to determine an area on the interface on which the user focuses based on the eye movement detection signal and provide an active scan voltage to the second scan line, so as to write the second data voltage to the pixel corresponding to said area.

Optionally, the pixel array of the display panel can be partitioned, and the area of partitions can be determined according to specific viewing needs. With eye tracking technology, a position of an area on the screen on which human eyes focus is determined, and the focused area is displayed at a higher resolution, while other areas of non-focus are displayed at a lower resolution. Specifically, eye movement of the user can be detected by a sensor, and the specific area viewed by the user can be determined, so as to achieve resolution differentiation of display areas. As the position where human eyes view changes, it is possible to switch among resolutions of areas at different positions, achieving the effect of adjustable resolution. Thereby, resolution of the respective display areas can be dynamically adjusted in real time, and the display power consumption is reduced.

Figure 16:
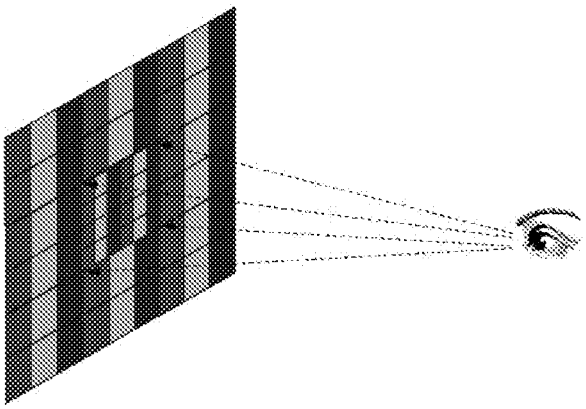
FIG. 16 illustrates the principle of adopting different resolutions for various areas on the display interface according to visual attention of the user.

For example, as illustrated in FIG. 16, it is possible to adopt the high resolution display mode in the area on which the user focuses and adopt the low resolution display mode in other areas, and thereby the display power consumption can be reduced.

Optionally, displaying can be performed in a manner of combining pixels according to actual needs. For example, in order to avoid distortion, pixels can be combined in a square in a display mode to display the picture pixels. For example, displaying is performed in a manner of binding one, four or nine physical pixels, wherein when one physical pixel corresponds to one picture pixel in display, it represents the high resolution display mode, and when nine physical pixels correspond to one picture pixel, it represents the low resolution display mode.

According to another embodiment of the present disclosure, there is further provided a display device comprising the display panel described above, the display device can be an AMOLED display, a television set, a digital camera frame, a mobile phone, a tablet computer and any other products or components having a display function.

Figure 18:
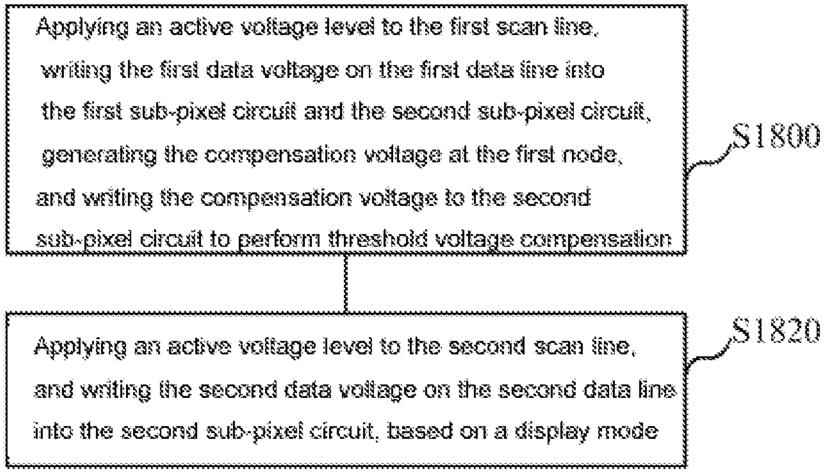
FIG. 18 is a schematic flowchart of a driving method applicable to the pixel circuit described above according to an embodiment of the present disclosure.

According to an embodiment of the present disclosure, there is further provided a method for driving the pixel circuit described above, as illustrated in FIG. 18, said method comprises: S1800, applying an active voltage level to the first scan line, writing the first data voltage on the first data line into the first sub-pixel circuit, generating the compensation voltage at the first node, and writing the compensation voltage to the second sub-pixel circuit to perform threshold voltage compensation; and S1820, applying an active voltage level to the second scan line, and writing the second data voltage on the second data line into the second sub-pixel circuit, based on a display mode.

Optionally, the method further comprises: applying an active voltage level to the first scan line, turning on the first input unit and the compensation voltage generating unit, providing the first data voltage on the first data line to the first driving unit, and generating the compensation voltage at the first node.

Optionally, the method further comprises: turning on the voltage compensating unit by using the active voltage level applied by the first scan line, so as to provide the compensation voltage generated at the first node to the second driving unit; in the case of displaying with a first resolution, applying an active voltage level to the second scan line, turning on the second input unit, so as to provide the data voltage on the second data line to the voltage compensating unit; in the case of displaying with a second resolution, applying an inactive voltage level to the second scan line, not turning on the second input unit so as not provide the data voltage on the second data line to the voltage compensation unit, the first resolution being higher than the second resolution.

Optionally, the method further comprises: providing an active voltage level to the first light emitting control signal terminal, turning on the first light emitting control unit, so as to provide the driving current generated by the first driving unit to the first light emitting element; and providing an active voltage level to the second light emitting control signal terminal, turning on the second light emitting control unit, so as to provide the driving current generated by the second driving unit to the second light emitting element.

Optionally, the method further comprises: before applying an active voltage level to the first scan line, applying an active voltage level to the reset signal terminal, turning on the reset unit, and resetting the first node.

To sum up, in the above embodiment of the present disclosure, since there is a compensation voltage generating unit in the first sub-pixel circuit, a compensation voltage is generated at the first node, so that threshold voltage compensation can be performed on the driving transistor in the first sub-pixel circuit, and the compensation voltage can be provided to the second sub-pixel circuit via the first node N1, and threshold voltage compensation is performed on the driving transistor in the second sub-pixel circuit via the voltage compensating unit in the second sub-pixel circuit, and thereby the influence caused by drifting of the threshold voltage Vth of the driving TFT due to manufacturing process and the aging of the device on the driving current flowing through the OLED is eliminated, uniformity of the light emitting display of the respective OLEDs can be ensured, and the display quality can be improved. Meanwhile, the first light emitting element is driven to emit light for displaying by providing the first sub-pixel circuit with the first data voltage, and the second data voltage can be provided to the second sub-pixel circuit according to requirement of the display resolution to adjust a display grayscale of the second light emitting element, so as to dynamically adjust the visual resolution which is synthesized from the first sub-pixel and the second sub-pixel in real time.

The above described merely are specific implementations of the present disclosure, but the protection scope of the present disclosure is not limited thereto, modification and replacements easily conceivable for a person skilled in the art within the technical range revealed by the present disclosure all fall into the protection scope of the present disclosure. Therefore, the protection scope of the present disclosure is based on the protection scope of the claims.

The present application claims priority of the Chinese Patent Application No. 201611044987.2 filed on Nov. 24, 2016, the entire disclosure of which is hereby incorporated in full text by reference as part of the present application.

What is claimed is:

1. A pixel circuit, comprising:

a first sub-pixel circuit connected to a first data line, a first scan line and a first node, and configured to write a first data voltage provided by the first data line under control of the first scan line, and generate a compensation voltage at the first node; and at least one second sub-pixel circuit connected to the first node, a second data line and a second scan line, and configured to perform threshold voltage compensation by using the compensation voltage generated at the first node;

wherein the at least one second sub-pixel circuit is configured to write a second data voltage provided by the second data line under control of the second scan line.

2. The pixel circuit according to claim 1, wherein the first sub-pixel circuit comprises a first input unit and a first driving unit, the first input unit is connected to the first data line and the first scan line, and configured to input the first data voltage provided by the first data line to the first driving unit under control of the first scan line;

the first driving unit is connected to the first node, and configured to generate a current for driving a first light emitting element to emit light under control of the first node.

3. The pixel circuit according to claim 2, wherein the first sub-pixel circuit further comprises:

a compensation voltage generating unit connected to the first node, the first scan line and the first driving unit, and configured to generate the compensation voltage at the first node under control of the first scan line.

4. The pixel circuit according to claim 2, wherein the first sub-pixel circuit further comprises:

a first light emitting control unit connected to the first light emitting element, a first light emitting control signal terminal and the first driving unit, and configured to provide the current generated by the first driving unit to the first light emitting element under control of the first light emitting control signal terminal.

5. The pixel circuit according to claim 2, wherein the first sub-pixel circuit further comprises:

a reset unit connected to a reset signal terminal and the first node, and configured to reset the first node under control of a reset signal provided by the reset signal terminal.

6. The pixel circuit according to claim 2, wherein the first input unit comprises a first input transistor, the first driving unit comprises a first driving transistor, a gate of the first input transistor is connected to the first scan line, a first electrode of the first input transistor is connected to the first data line, and a second electrode of the first input transistor is connected to a first electrode of the first driving transistor;

a gate of the first driving transistor is connected to the first node, and a second electrode of the first driving transistor configured to output the current for driving the first light emitting element to emit light.

7. The pixel circuit according to claim 3, wherein the compensation voltage generating unit comprises:

a first compensation transistor having a gate connected to the first scan line, a first electrode connected to the first node, and a second electrode connected to an output terminal of the first driving unit; and a first compensation capacitor having a first terminal connected to the first node, and a second terminal connected to a first voltage terminal.

8. The pixel circuit according to claim 4, wherein the first light emitting control unit comprises:

a first light emitting control transistor having a gate connected to the first light emitting control signal terminal, a first electrode connected to the first voltage terminal, and a second electrode connected to an input terminal of the first driving unit; and a second light emitting control transistor having a gate connected to the first light emitting control signal terminal, a first electrode connected to the output terminal of the first driving unit, and a second electrode connected to the first light emitting element.

9. The pixel circuit according to claim 5, wherein the reset unit comprises:

a reset transistor having a gate connected to the reset signal terminal, a first electrode connected to a second voltage terminal, and a second electrode connected to the first node.

10. The pixel circuit according to claim 1, wherein each of the at least one second sub-pixel circuit comprises a second input unit, a voltage compensating unit and a second driving unit;

wherein the second input unit is connected to the second data line and the second scan line, and configured to input the second data voltage provided by the second data line to the voltage compensating unit under control of the second scan line;

the voltage compensating unit is connected to the first node and the first scan line, and configured to write the compensation voltage generated at the first node under control of the first scan line;

the second driving unit is connected to the voltage compensating unit, and configured to perform threshold voltage compensation by using the compensation voltage written by the voltage compensating unit and generate a current for driving the second light emitting element to emit light.

11. The pixel circuit according to claim 10, wherein each of the at least one second sub-pixel circuit further comprises:

a second light emitting control unit connected to the second light emitting element, a second light emitting control signal terminal and the second driving unit, and configured to provide the current generated by the second driving unit to the second light emitting element under control of the second light emitting control signal terminal.

12. The pixel circuit according to claim 10, wherein the second input unit comprises a second input transistor having a gate connected to the second scan line, a first electrode connected to the second data line, and a second electrode connected to the voltage compensating unit.

13. The pixel circuit according to claim 10, wherein the voltage compensating unit comprises a second compensation transistor and a second compensation capacitor; wherein a gate of the second compensation transistor is connected to the first scan line, a first electrode of the second compensation transistor is connected to the first node, and a second electrode of the second compensation transistor is connected to a first terminal of the second compensation capacitor; a second terminal of the second compensation capacitor is connected to an output terminal of the second input unit; and the second driving unit comprises a second driving transistor having a gate connected to an output terminal of the voltage compensating unit, a first electrode connected to the first voltage terminal, and a second electrode configured to output the current for driving the second light emitting element to emit light.

14. The pixel circuit according to claim 11, wherein the second light emitting control unit comprises:

a third light emitting control transistor having a gate connected to the second light emitting control terminal, a first electrode connected to an output terminal of the second driving unit, and a second electrode connected to the second light emitting element.

15. A method of driving the pixel circuit according to claim 1, comprising:

applying an active voltage level to the first scan line, writing the first data voltage on the first data line into the first sub-pixel circuit, generating the compensation voltage at the first node, and providing the compensation voltage to the second sub-pixel circuit to perform threshold voltage compensation; and applying an active voltage level to the second scan line, and writing the second data voltage on the second data line into the second sub-pixel circuit.

16. The method according to claim 15, wherein the first sub-pixel circuit comprises a first input unit, a first driving unit and a compensation voltage generating unit; the first input unit is connected to the first data line, the first scan line and the first driving unit; the first driving unit is connected to the first node and the compensation voltage generating unit; the compensation voltage generating unit is connected to the first node and the first scan line;

the method further comprises:

applying an active voltage level to the first scan line, turning on the first input unit and the compensation voltage generating unit, providing the first data voltage on the first data line to the first driving unit, and generating the compensation voltage at the first node.

17. The method according to claim 16, wherein each of the at least one second sub-pixel circuit further comprises a second input unit, a second driving unit and a voltage compensating unit; the second input unit is connected to the second data line, the second scan line and the voltage compensating unit; the voltage compensating unit connected to the first node, the first scan line and the second driving unit;

the method further comprises:

turning on the voltage compensating by the active voltage level applied by the first scan line, so as to provide the compensation voltage generated at the first node to the second driving unit;

in a case of displaying with a first resolution, applying an active voltage level to the second scan line, and turning on the second input unit, so as to write the data voltage on the second data line to the voltage compensating unit;

in the case of displaying with a second resolution, applying an inactive voltage level to the second scan line, and turning off the second input unit, the first resolution being higher than the second resolution.

18. The method according to claim 17, wherein the first sub-pixel circuit further comprises a first light emitting control unit connected to the first light emitting element, the first light emitting control signal terminal and the first driving unit; the second sub-pixel circuit further comprises a second light emitting control unit connected to the second light emitting element, the second light emitting control signal terminal and the second driving unit;

the method further comprises:

providing an active voltage level to the first light emitting control signal terminal, turning on the first light emitting control unit, so as to provide the current generated by the first driving unit to the first light emitting element; and providing an active voltage level to the second light emitting control signal terminal, turning on the second light emitting control unit, so as to provide the current generated by the second driving unit to the second light emitting element.

19. The method according to claim 15, wherein the first sub-pixel circuit further comprises a reset unit connected to the reset signal terminal and the first node, and the method further comprises:

before applying the active voltage level to the first scan line, applying an active voltage level to the reset signal terminal, turning on the reset unit, and resetting the first node.

20. A display panel, comprising:

a plurality of pixel circuits each according to claim 1 arranged in an array;

at least one sensor configured to detect eye movement of a user viewing an interface of the display panel and generate an eye movement detection signal; and a processor configured to determine an area on the interface to which the user focuses based on the eye movement detection signal and provide the active voltage level to the second scan line, so as to write the second data voltage to the second sub-pixel circuit corresponding to the pixel circuits in said area.

* * * * *